Oct. 28, 1952      F. S. YOUNG      2,615,615
FIELD COMPRESSOR
Filed Aug. 12, 1949
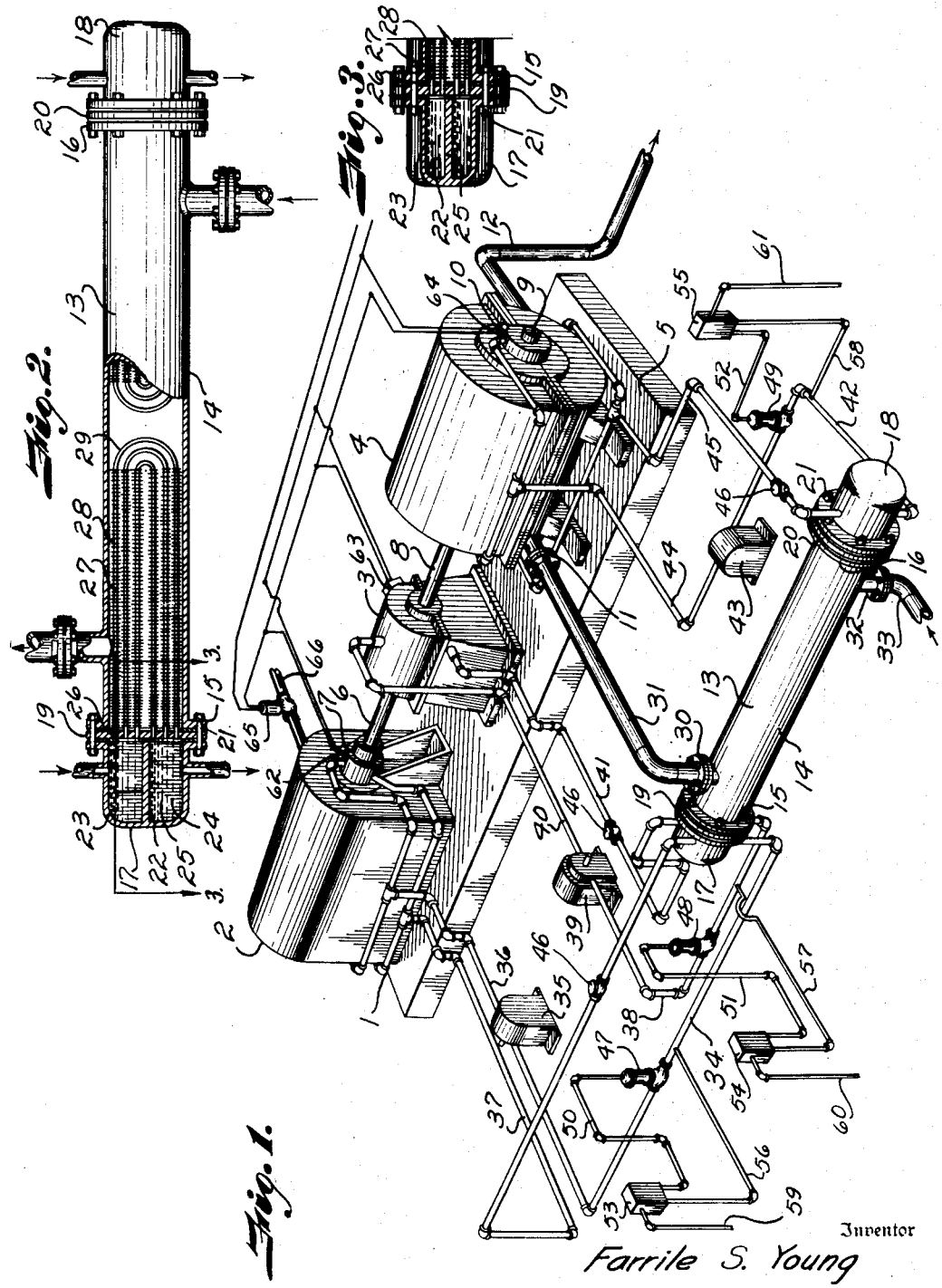
Inventor
Farrile S. Young
By
Fishburn & Mullendore
Attorneys Patented Oct. 28, 1952

2,615,615

UNITED STATES PATENT OFFICE 2,615,615

FIELD COMPRESSOR

Farrile S. Young, Kansas City, Mo., assignor to Panhandle Eastern Pipe Line Co., Kansas City, Mo., a corporation of Delaware Application August 12, 1949, Serial No. 109,861

3 Claims. (Cl. 230—8)

This invention relates to field compressors and particularly to an oil cooling system for the prime movers, compressors and other equipment in such compressors used for moving gas in pipe lines.

The present invention is an improvement over my Patent No. 2,424,010, July 15, 1947, on Field Compressor.

In gas compressor plants and particularly plants having centrifugal turbines or blowers serving as compressors a seal oil is circulated through the bearings. The speed reducers or increasers use one type of lubricating oil and the prime movers another type. This means there are usually three different kinds or types of oil which must be cooled to prevent overheating or other conditions of operation which result in inefficiency or replacement of parts. The present day practice of drilling water wells for supply of water or the provision of large reservoirs for cooling of the oil are expensive procedures and the present arrangement is to eliminate same.

The objects of the present invention are to provide a field gas compressor installation with an oil cooling system wherein the incoming gas to the compressor cools the oil for the prime mover, compressors and other equipment; to provide a gas-oil heat exchanger for cooling the lubricating oil used in the compressor installation; to provide means for supplying gas in a confined path from a source of supply to said heat exchanger for cooling the oil for the equipment; to provide means for cooling a plurality of types of oil in the heat exchanger; to provide means for circulating the oil through the heat exchanger and the equipment utilizing said oil; to provide safety devices in the oil and lines therefor to prevent damage to the equipment in event of failure in the oil cooling or circulating equipment; to provide for stopping flow of oil in event of leakage of gas into said oil; and to provide a simple and economical oil cooling apparatus for gas compressor installations capable of operating in an efficient manner for the purpose set forth.

In accomplishing these and other objects of this invention, I have provided improved details of structure, the preferred forms of which are illustrated in the accompanying drawings, wherein:

Fig. 1 is a diagrammatic perspective view illustrating a gas compressor installation and oil cooling system therefor.

Fig. 2 is a side elevation of the heat exchanger forming part of my invention, a portion of the exchanger being broken away to illustrate the circulation of oil therethrough.

Fig. 3 is a horizontal sectional view through the heat exchanger head on the line 3—3, Fig. 2.

Referring more in detail to the drawings:

1 designates a compressor installation embodying the features of my invention wherein a prime mover 2, speed increaser or decreaser 3 and a compressor 4 are supported on a base 5. The base may be of permanent type or may be skids or the like whereby the compressor and drive therefor may be moved from one place to another or may be placed on a truck for transportation.

The prime mover 2 may be a reciprocating engine, electric motor, steam turbine, gas turbine, or the like, having a suitable source of motivating fluid to effect operation thereof and rotation of a shaft 6 supported in suitable bearings 7 carried by said prime mover. The speed increaser or decreaser 3 may be of any conventional type having suitable gearing therein driven by the shaft 6 whereby a shaft 8 is driven at a different speed. The shaft 8 is suitably connected to a shaft 9 of the compressor 4, which also may be a centrifugal turbine or blower, said shaft 9 being supported in suitable bearings 10 carried by the compressor.

The compressor 4 has a gas inlet connection 11 and a gas discharge 12, said discharge being connected to a suitable pipe line which carries the compressed gas. Preferably located adjacent the compressor is a heat exchanger 13 having a tubular body portion 14 with flanged ends 15 and 16 to which are mounted heads 17 and 18 respectively, plates 19 and 20 being arranged intermediate the heads and the respective flanged ends of the body member of the heat exchanger, said heads and plates being secured to the body member by means of suitable devices 21 such as bolts and nuts to form a gastight seal therebetween. Each of the heads 17 and 18 is provided with horizontal partitions 22 to form inlet and outlet chambers 23 and 24 respectively. The head 17 also has a vertical partition 25 whereby two different types of oil may be circulated through the adjacent end of the heat exchanger.

The plates 19 and 20 are provided with a plurality of apertures 26 into which are secured the ends of oil tubes 27, said tubes being arranged whereby one end thereof communicates with the oil in the chamber 23 and the other end with the outlet chamber 24, said tubes preferably being provided with a plurality of fins 28 to increase the radiating surfaces thereof. Each of the tubes preferably extends from the plate longitudinally of the body member, have a reverse bend 29 adjacent longitudinal center of the body member and extend back to the plate, as illustrated in Fig. 2.

The body member 14 of the heat exchanger is preferably provided with a suitable connection 30 adjacent one end thereof which is connected by a pipe 31 leading to the gas inlet connection 11 of the compressor 4. Adjacent the opposite end of the body member is a gas connection 32 connected by a pipe 33 with the pipe line carrying the gas whereby during operation of the compressor, gas from the pipe line leading to the compressor plant moves through the pipe 33, connection 32, through the interior of the body member 14 in contact with the finned tubes 27, through the connection 30, pipe 31, compressor inlet 11, through the compressor and is discharged through the discharge pipe 12 to the pipe line carrying the compressed gas toward the point of distribution.

One of the outlet chambers 24 of the head 17 is connected by a pipe 34 with the inlet of an oil pump 35, the outlet of said pump being connected by a pipe 36, having branches leading to the bearing 7 of the prime mover. Oil draining from the bearings 7 is carried by pipe 37 to the respective inlet chamber 23 of the head 17 whereby said oil moves through the tubes 27 to the outlet chamber 24, thereby providing a circulation of the oil from the bearings 7 to the heat exchanger and back to the bearings by the operation of the pump 35 to maintain a supply of cool oil to said bearings. The other outlet chamber 24 of the head 17 is connected by piping 38 to the inlet of a pump 39, the outlet of said pump being connected by piping 40 to the speed increaser or decreaser 3, the return of said oil being by a pipe 41 connecting the speed increaser or decreaser 3 with the respective inlet chamber 23 of the head 17, whereby said oil will circulate through the tubes 27 in the heat exchanger and be cooled by the gas passing therethrough whereby the operation of the pump 39 maintains a supply of cool oil to the heat increaser or decreaser 3.

The outlet chamber 24 in the head 18 is connected by piping 42 with the inlet of an oil pump 43, the outlet of said pump being connected by piping 44 to the bearings 10 of the compressor 4 to supply cool seal oil to said compressor, the heated oil from the compressor being returned through piping 45 to the inlet chamber 23 of the head 18 for circulation through the respective tubes 27 whereby the gas flowing through the heat exchanger cools the seal oil to maintain a cool supply of seal oil to the compressor.

Check valves 46 are provided in each of the hot oil piping 37, 41 and 45 whereby flow through said piping can only be from the equipment to the heat exchanger. Motor valves 47, 48 and 49 are located in the piping 34, 38 and 42 respectively and suitably operated by pressure controls whereby in the event of excessive pressure in the oil piping such as would indicate that gas is leaking thereinto, said valves will close the flow of oil through the line to the equipment. Diaphragm type valves are illustrated, said valves being connected by flow lines 50, 51 and 52 leading to pilot valves 53, 54 and 55 respectively, said pilot valves being connected by piping 56, 57 and 58 to the respective oil piping whereby the oil pressure therein will actuate the respective pilot valves for flow of fluid pressure from a suitable source through fluid pressure lines 59, 60 and 61. With this arrangement, if the pressure in the oil piping becomes excessive the pilot valve associated with said line will open and fluid pressure be delivered to the respective motor valve to close same and stop flow of oil through the line, also the check valve in the hot oil piping to the heat exchanger will close, thereby preventing the excessive pressure or gas from entering the equipment and eliminating any possibility of explosion or damage therefrom.

Also, thermostats 62, 63 and 64 are suitably mounted on the prime mover 2, speed reducer or increaser 3 and compressor 4, whereby excessive temperature of oil in any of said equipment will close a suitable electric circuit and actuate a valve 65 in the line 66 supplying motivating fluid to the prime mover whereby said flow of fluid is stopped and the equipment shut down.

Operation of the device constructed and assembled as described is as follows:

Gas may be supplied from any suitable source and pass through a scrubber (not shown). Gas from a source of supply such as a gas well, usually enters the line at a temperature of from 40 to 60° F. This cool gas passes through the pipe 33, inlet connection 32 of the heat exchanger, through the heat exchanger in contact with the finned tubes 27 to the outlet connection 30 and through the pipe 31 to the compressor where the gas is compressed and discharged to the pipe line Operation of the pumps 35, 39 and 43 effects a flow of oil through the prime mover 2, speed increaser or decreaser 3 and compressor 4 respectively, the hot oil passing through the respective pipes to the inlet chambers of the heads through the respective finned tubes 27 where the oil is cooled by the confined flow of gas in the heat exchanger, the cool oil passing out through the outlet compartment to the pump for supply to the respective equipment, thereby maintaining a cool supply of oil at all times to the bearings and other portions of the prime mover requiring lubrication, to the speed increaser or decreaser and also a supply of cool seal oil to the compressor, the heat exchanger handling the various types or grades of oil required in the compressor plant.

The motor valves 47, 48 and 49, check valves 46 and heat responsive controls provide protection for the equipment in the event of any leaks of gas into the oil piping. This arrangement provides a field compressor installation which will maintain cool oil indefinitely during operation and will shut down the equipment if dangerous operating conditions arise whereby substantially no attention is required for the installation and reduced operating costs result.

It will be obvious from the foregoing that I have provided an oil cooling system in a compressor installation whereby all of the oil is maintained at a cool, satisfactory condition for operation of the compressor for long periods of time without attention or large oil reservoirs, the oil remaining cool all the time during which the compressor is in operation.

What I claim and desire to secure by Letters Patent is:

1. An apparatus of the character described comprising, a centrifugal compressor, means for driving the compressor, oil for lubricating the compressor, a gas supply line leading to the compressor, means in said gas supply line for cooling said oil, a hot oil flow line from the compressor to the cooling means, a check valve in the hot oil flow line permitting flow only toward the cooling means, means for flow of cooled oil from the cooling means to the compressor, a pressure actuated valve in said cooled oil flow means for shutting off flow therethrough, a conduit connecting said pressure actuated valve to a source of fluid pressure, a pilot valve in the conduit normally closing same and responsive to a predetermined pressure for opening said conduit, and means connecting the pilot valve to the cooled oil flow means between the cooling means and the pressure actuated valve whereby predetermined pressure in the cooled oil flow means actuates the pilot valve to open the conduit for flow of fluid pressure to the pressure actuated valve to operate same and shut off flow in the cooled oil flow means.

2. An apparatus of the character described comprising, a centrifugal gas compressor for moving gas in a gas line, means for driving the compressor, seal oil for the compressor, a gas supply line leading to the compressor, a heat exchanger in the gas supply line and having separate gas and oil flow passages for cooling said oil, a hot oil flow line from the compressor to the heat exchanger, a check valve in the hot oil flow line permitting flow only toward the heat exchanger, a cool oil flow line from the heat exchanger to the compressor, a pump in the cool oil flow line for effecting circulation of said seal oil from the heat exchanger to the compressor, a pressure actuated valve in said cooled oil flow line for shutting off flow therethrough, a conduit connecting said pressure actuated valve to a source of fluid pressure, a pilot valve in the conduit normally closing same and responsive to a predetermined pressure for opening said conduit, and means connecting the pilot valve to the cooled oil flow line between the heat exchanger and the pressure actuated valve whereby predetermined pressure in the cooled oil flow line actuates the pilot valve to open the conduit for flow of fluid pressure to the pressure actuated valve to operate same and shut off flow in the cooled oil flow line.

3. An apparatus of the character described comprising, a compressor, a prime mover, means connecting the compressor and prime mover for driving the compressor at a differential speed relative to the speed of the prime mover, oil for lubricating the compressor, prime mover and connecting means, a gas supply line leading to the compressor, a heat exchanger in said gas supply line for cooling said oil, hot oil lines from the compressor, prime mover and connecting means to the heat exchanger, means in the hot oil lines for preventing backflow from the heat exchanger, cool oil lines from the heat exchanger to the compressor, prime mover and connecting means, pumps for effecting circulation of the oil from the heat exchanger to the compressor, prime mover and connecting means, pressure actuated valves in said cooled oil lines for shutting off flow therethrough, conduits connecting said pressure actuated valves to a source of fluid pressure, pilot valves in the respective conduits normally closing same and responsive to a predetermined pressure for opening said conduits, means connecting the pilot valves to the respective cooled oil lines between the heat exchanger and the pressure actuated valves whereby predetermined pressure in the cooled oil lines actuates the respective pilot valve to open the conduit for flow of fluid pressure to the respective pressure actuated valve to operate same and close the flow in the cooled oil lines, means connecting the prime mover to a source of motivating fluid, a shutoff valve in said motivating fluid connecting means, and means operatively connected with said shutoff valve and responsive to predetermined temperature of the oil in the compressor, prime mover and connecting means for operating the shutoff valve to shut down the prime mover.

FARRILE S. YOUNG.

REFERENCES CITED

The following references are of record in the file of this patent:

UNITED STATES PATENTS

| Number | Name | Date |
|---|---|---|
| 450,517 | Mayer | Apr. 14, 1891 |
| 452,534 | Winkler | May 19, 1891 |
| 465,276 | Kuhn | Dec. 15, 1891 |
| 1,834,600 | Wineman | Dec. 1, 1931 |
| 2,322,874 | Neeson et al. | June 29, 1943 |
| 2,424,010 | Young | July 15, 1947 |
| 2,461,076 | Neeson | Feb. 8, 1949 |